United States Patent [19]

Tanno

[11] Patent Number: 4,982,431
[45] Date of Patent: Jan. 1, 1991

[54] SIGNAL DISTINCTION CIRCUIT

[75] Inventor: Masaya Tanno, Ora, Japan

[73] Assignee: Sanyo Electric Co., Ltd., Osaka, Japan

[21] Appl. No.: 438,168

[22] Filed: Nov. 16, 1989

[30] Foreign Application Priority Data

Nov. 16, 1988 [JP] Japan .................................. 63-290441
Nov. 18, 1988 [JP] Japan ........................... 63-150819[U]

[51] Int. Cl.$^5$ ............................................. H04H 5/00
[52] U.S. Cl. ........................................... 381/13; 381/7
[58] Field of Search ....................... 381/3, 4, 7, 15, 13; 331/20; 324/78 R, 78 D, 78 F, 79 D; 455/67, 226; 84/454

[56] References Cited

U.S. PATENT DOCUMENTS

| 4,028,985 | 6/1977 | Merritt | 84/454 |
| 4,198,606 | 4/1980 | Baba | 84/454 |
| 4,203,076 | 5/1980 | Yamashita | 331/20 |
| 4,273,023 | 6/1981 | Mercer | 84/454 |
| 4,546,490 | 10/1985 | Miller-Thomson et al. | 381/56 |
| 4,688,464 | 8/1987 | Gibson et al. | 324/78 R |
| 4,707,856 | 11/1987 | Tanaka et al. | 381/15 |
| 4,785,474 | 11/1988 | Bernstein et al. | 324/78 F |

Primary Examiner—Forester W. Isen
Attorney, Agent, or Firm—Darby & Darby

[57] ABSTRACT

A signal distinction circuit comprising a noise detector for detecting a noise included in a received signal; and a maintaining circuit for maintaining the condition of a signal outputted from a detector for detecting a discrimination signal according to a signal outputted from the noise detector so that since the noise detector and the maintaining circuit prevent the condition of a signal outputted from the distinction circuit from being changed when an inteference such as a multipath interference occuurs, an output corresponding to a received signal can be reliably obtained.

5 Claims, 2 Drawing Sheets

SIGNAL DISTINCTION CIRCUIT

BACKGROUND OF THE INVENTION

1. Field of the invention

The present invention relates to a signal distinction circuit for detecting a discrimination signal having a predetermined frequency, and more particularly, to a signal distinction circuit capable of preventing a malfunction in distinguishing the discrimination signal due to, for example, a multi-path interference.

2. Description of the related art

An FMX stereophonic broadcasting is proposed to improve the S/N of an FM stereophonic broadcasting and enlarge a service area. According to the FMX stereophonic broadcasting, a compressed stereophonic difference signal is transmitted simultaneously with the transmission signal of the FM stereophonic broadcasting. The compressed stereophonic difference signal modulate a subcarrier of 38 KHz in quardrature with respect to a subcarrier of 38 KHz which is AM-modulated by a stereophonic difference signal. A discrimination signal of 10 Hz is included in the transmission signal of the FMX stereophonic broadcasting so that the FMX stereophonic broadcasting is distinguished from the FM stereophonic broadcasting. Therefore, in order to receive the FMX stereophonic broadcasting, it is necessary to detect the discrimination signal and switch the receiving mode of a receiver to the FMX stereophonic broadcasting receiving mode.

The FMX stereophonic broadcasting is described in detail on pages from 11 through 15 of a magazine "JAS JOURNAL" for September, 1986.

The discrimination signal of 10 Hz can be detected by a signal distinction circuit as shown in FIG. 3. Referring to FIG. 3, a stereophonic pilot signal of 19 KHz applied to a first input terminal 1 is divided into approximately 74 Hz by a first frequency divider 2 and then, applied to a counter 3 as a clock signal. The discrimination signal of 10 Hz applied to a second input terminal 4 is applied to a pulse generator 6 through a bandpass filter 5. Therefore, a pulse signal having the same frequency as that of the discrimination signal applied to the input terminal 4 is generated by the pulse generator 6. The pulse signal thus produced is divided by a second frequency divider 7, and then, supplied to the counter 3 as an actuating signal. Consequently, the counter 3 counts the pulse number of the clock signal while the level of the pulse signal is maintained to be an "H" level. A detector 8 detects whether or not a value counted by the counter 3 equals to a predetermined value.

However, the signal distinction circuit shown in FIG. 3 generates a signal indicating that it is receiving the transmission signal of the FM stereophonic broadcasting when the discrimination signal of 10 Hz is subjected to an interference such as a multipath interference and thus the average frequency thereof is changed. As such, although the receiver is receiving the signal of an FMX stereophonic broadcasting, the receiver is switched to receive the signal of the FM stereophonic broadcasting. In particular, the interference such as the multipath interference continues for a short period of time. Therefore, when the interference is terminated, the receiver is switched to receive the FMX stereophonic broadcasting. Thus, the receiver is unnecessarily switched two times.

In addition, when the receiver is switched to listen to a broadcasting which transmits a signal including a discrimination signal, the discrimination signal is distorted and consequently, its level is lowered when the discrimination signal is subjected to the multipath interference or when an external noise is mixed therewith. It is desirable that the receiving mode of the receiver is not changed as long as the listener desires to keep listening to the above-described broadcasting. The following problem occurs according to the known receiver. That is, for example, if the level of the discrimination signal of 10 Hz instantaneously falls while an FMX stereophonic broadcasting is being received, the receiver is switched to receive an FM stereophonic broadcasting. As a result, a noise level fluctuates, which causes a listener to feel uncomfortable.

SUMMARY OF THE INVENTION

The present invention has been made to solve the above described disadvantages and has for its essential object to provide a signal distinction circuit.

The signal distinction circuit in accordance with the present invention comprises a pulse generator for generating a pulse in accordance with the frequency of a discrimination signal; a counter for counting the pulse number of a clock signal according to a signal outputted from the pulse generator; a detector for detecting the discrimination signal based on a value counted by the counter; a level detector for detecting the level of the discrimination signal, thus generating a reset signal for resetting the detector; and a gate circuit for interrupting the reset signal according to the condition of a signal outputted from the detector.

According to the above described construction, the gate circuit is interrupted in response to a first signal applied from the detector to the gate circuit while a signal transmitted from a broadcasting station being received by the signal distinction circuit includes a discrimination signal and a reset signal is prohibited from being applied from the level detector to the detector. Therefore, even though the discrimination signal is interrupted for a short period of time or the level thereof lowers, the detector can be prevented from being reset. When a signal transmitted from the broadcasting station to the receiver includes no discrimination signals, the gate circuit is opened in response to a second signal applied from the detector to the gate circuit. Accordingly, while a signal not including the discrimination signal is being received by the signal distinction circuit, the detector is kept to be reset. When a tuning condition is changed, i.e., when the receiver is switched from a condition in which a signal not including the discrimination signal is received to a condition in which a signal including the discrimination signal is received, and consequently, when the discrimination signal whose level is higher than a predetermined level is applied to the level detector, the reset signal is not applied to the AND gate and the detector detects a value counted by the counter.

A signal distinction circuit according to another preferred embodiment of the present invention comprises a noise detector for detecting a noise included in a received signal; and a maintaining circuit for maintaining the condition of a signal outputted from a detector for detecting a discrimination signal according to a signal outputted from the noise detector.

According to the above-described construction, the noise detector detects, using the noise detector, a noise generated due to a multipath interference and consequently, the maintaining circuit is operated. Accordingly, the condition of a signal outputted from the signal distinction circuit can be prevented from being changed when an inteference occurs.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Embodiment 1

Figure 1:
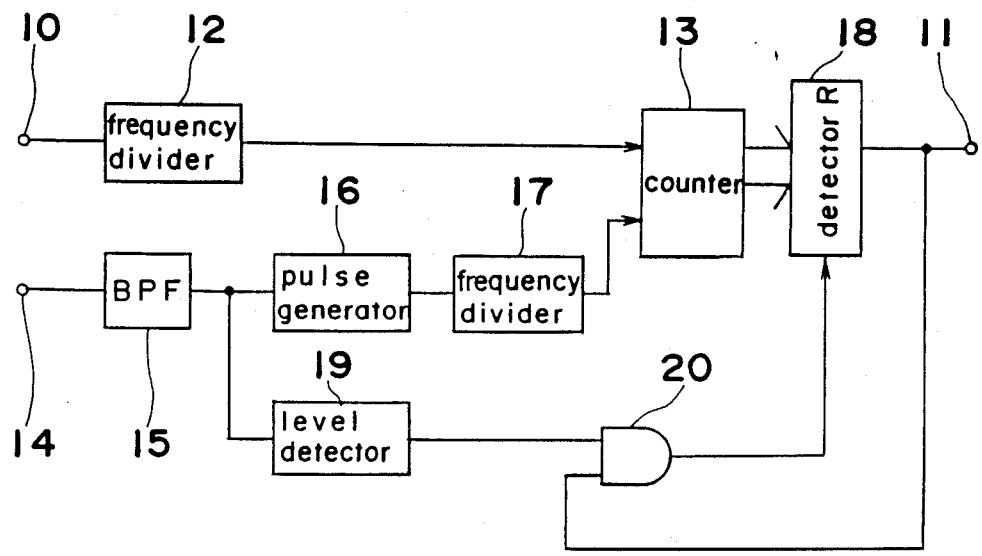
FIG. 1 is a circuit diagram showing a first embodiment of the present invention.
Figure 3:
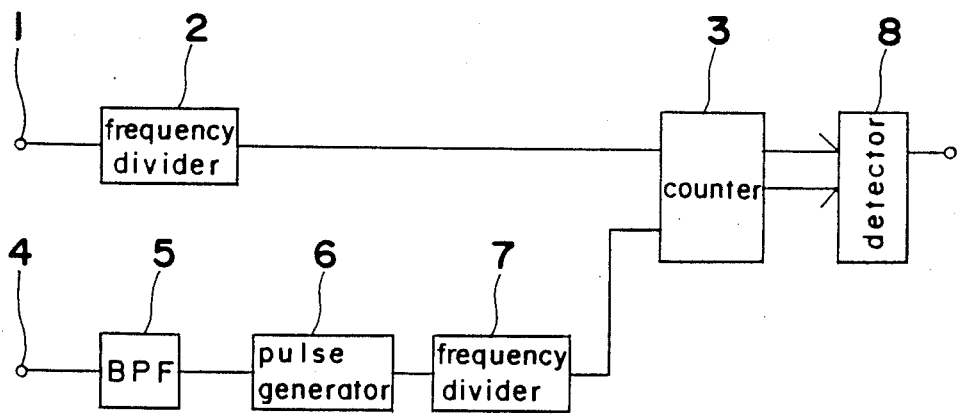
FIG. 3 is a circuit diagram showing a known signal distinction circuit.

Referring to FIG. 1 showing a circuit diagram of a signal distinction circuit of a first embodiment according to the present invention, the first embodiment thereof is described below.

The signal distinction circuit according to the present invention detects, using a counter, a discrimination signal having a predetermined frequency and has a construction which does not malfunction even though a signal is interrupted.

An FMX stereophonic broadcasting is proposed to improve the S/N of an FM stereophonic broadcasting and enlarge a service area. According to the FMX stereophonic broadcasting, a compressed stereophonic difference signal is transmitted simultaneously with the transmission signal of the FM stereophonic broadcasting. The compressed stereophonic difference signal is quardrature with respect to a subcarrier of 38 KHz which is produced by AM-modulating a stereophonic difference signal. A discrimination signal of 10 Hz is included in the transmission signal of the FMX stereophonic broadcasting so that the FMX stereophonic broadcasting is distinguished from the FM stereophonic broadcasting. Therefore, in order to receive the FMX stereophonic broadcasting, it is necessary to detect the discrimination signal and suitably switch the receiving mode of a receiver to the FMX stereophonic broadcasting receiving mode.

The discrimination signal of 10 Hz can be detected by a signal distinction circuit as shown in FIG. 1. Referring to FIG. 1, a stereophonic pilot signal of 19 KHz applied to a first input terminal 10 is divided into approximately 74 Hz by a first frequency divider 12 and then, applied to a counter 13 as a clock signal. The discrimination signal of 10 Hz applied to a second input terminal 14 is applied to a pulse generator 16 through a bandpass filter 5. Therefore, a pulse signal having the same frequency as that of the discrimination signal applied to the input terminal 14 is generated by the pulse generator 16. The pulse signal thus produced is divided by a second frequency divider 17, and then, supplied to the counter 13 as an actuating signal. Consequently, the counter 13 counts the pulse number of the clock signal while the pulse signal is maintained to be an "H" level. A detector 18 detects whether or not a value counted by the counter 13 equals to a predetermined value.

The signal distinction circuit further comprises a level detector 19 for detecting the level of a signal outputted from the output terminal of the bandpass filter 15. The level detector 19 generates an "L" level signal when the level of the signal outputted from the bandpass filter 15 is more than a predetermined value and generates an "H" level signal when when the level of the signal outputted therefrom is less than the predetermined value. Therefore, when the level of the above described signal falls for some reason or other, the level of the signal outputted from the level detector 19 becomes "H". As a result, the detector 18 is reset.

The signal distinction circuit further comprises an AND gate 20. A reset signal outputted from the level detector 19 is applied to the first input terminal of the AND gate 20. A signal outputted from the detector 18 is applied to the second input terminal thereof. The output of the AND gate 20 is applied to the reset terminal of the detector 18.

A broadcasting station capable of transmitting FMX radio waves is always transmitting the FMX radio waves. The signal transmitted from the broadcasting station includes an ID signal of 10 Hz. On the other hand, some broadcasting stations cannot transmit FMX radio waves, but the FM radio waves. Thus, broadcasting stations transmit signals having different frequencies which range within a predetermined band. Accordingly, every time a receiver is tuned to a certain frequency, the receiver capable of receiving FM and FMX stereophonic broadcastings is required to distinguish the FM stereophonic broadcasting and the FMX stereophonic broadcasting form each other. To this end, the provision of the signal distinction circuit shown in FIG. 1 is essential. However, when the receiver receives a broadcasting of a certain broadcasting station and when it is detected that the broadcasting being received is transmitted from an FMX stereophonic broadcasting station, the FMX stereophonic broadcasting receiving condition is not changed unless the receiver is tunes to a different frequency. Therefore, it is unnecessary to provide the signal distinction circuit with a decision means for detecting the level of a signal.

The operation of the signal distinction circuit shown in FIG. 1 is described in correspondence with signal receipt conditions.

Supposing that an FM stereophonic broadcasting is being received, the stereo pilot signal of 19 KHz applied to the first input terminal 10 is divided by the first frequency divider 12 and the divided signal is applied to the counter 13 as a clock signal. At this time, since the receiver is receiving the FM stereophonic broadcasting, the discrimination signal of 10 Hz is not applied to the second input terminal 14. Consequently, the actuating signal is not applied from the second frequency divider 17 to the counter 13. Accordingly, the counter 13 does not perform a counting operation and the level of a signal outputted from the detector 18 becomes "H". The "H" level signal outputted from the detector 18 is transmitted from the output terminal 11 to a circuit (not shown) such as a display circuit and also to the second input terminal of the AND gate 20. As a result, the AND gate 20 is opened.

Since the discrimination signal is not applied to the second input terminal 14, the level of a signal inputted to the level detector 19 becomes "L" and the level of a signal outputted therefrom becomes "H". The "H" level signal outputted from the level detector 19 passes through the AND gate 20 which is opened and applied to the reset terminal of the detector 18. As a result, the detector 18 is reset and the level of the output terminal 11 is maintained to be "H".

When the tuning condition is changed, that is, when an FMX stereophonic broadcasting is received, the stereo pilot signal of 19 KHz is applied to the first input terminal 10 and the discrimination signal of 10 Hz is applied to the second input terminal 14. If the level of the discrimination signal of 10 Hz is sufficiently high, the level of a signal outputted from the level detector 19 becomes "L" and the "L" level signal is applied to the detector 18 through the AND gate 20. As a result, the reset condition of the detector 18 is terminated. Then, the counter 13 counts the pulse number of a clock signal outputted from the first frequency divider 12 in correspondence with the actuating signal outputted from the second frequency divider 17. Consequently, the result counted by the counter 13 is detected by the detector 18. If the value counted by the counter 13 equals to the predetermined value, the detector 18 generates an "L" level signal indicating that the receiver is receiving the FMX stereophonic broadcasting. The "L" level signal outputted from the detector 18 is transmitted from the output terminal 11 to the circuit such as the display circuit as described above and applied to the second input terminal of the AND gate 20. Accordingly, the AND gate 20 is closed and the level of a signal outputted therefrom becomes "L", which prevents the detector 18 from being reset. The detector 18 is not reset in this condition and the level of a signal outputted from the detector 18 is changed only by the value counted by the counter 13. Accordingly, when the signal distinction circuit detects the FMX stereophonic broadcasting receiving condition, the signal distinction circuit does not respond to the change of the level of the discrimination signal. Thus, an erroneous switching can be prevented.

When the tuning condition is changed again, i.e., when the FM stereophonic broadcasting is received, the discrimination signal of 10 Hz is not inputted to the signal distinction circuit. Therefore, the counter 13 stops its operation. At this time, the detector 18 maintains the FMX stereophonic broadcasting receiving condition. This condition can be released by detecting that the discrimination signal of 10 Hz is not present during a predetermined period of time and by resetting the detector 18. By doing so, the level of a signal outputted from the detector 18 becomes "H" and the AND gate 20 is opened. As a result, the "H" level signal outputted from the level detector 19 is applied to the detector 18. Thus, the signal distinction circuit is in the FM stereophonic broadcasting receiving condition.

The level detector 19 has a predetermined threshold and detects the level of a signal applied thereto from the bandpass filter 15. That is, when the level of the signal outputted from the bandpass filter 15 is more than the threshold, the level detector 19 generates an "L" level signal and when the level of the signal outputted therefrom is less than the threshold, the level detector 19 generates an "H" level signal. In order to prevent the detector 19 from malfunctioning due to, for example, a noise, the signal distinction circuit is so constructed that level detector 19 outputs either the "H" or "L" level signal after the level detector 19 performs a plurality of detections.

The above description of the present invention is concerned with the application of the signal distinction circuit to the FMX stereophonic broadcasting and the FM stereophonic broadcasting. But utilizing the signal distinction circuit, a receiver is capable of receiving both a signal including a discrimination signal and a signal not including the discrimination signal. For example, the present invention can be applied to a broadcasting system, widely adopted in Europe, in which an ARI (traffic information) broadcasting (corresponding to FMX broadcasting) and an FM stereophonic broadcasting are received.

As described above, the signal distinction circuit according to the first embodiment is capable of reliably distinguishing a discrimination signal included in a signal transmitted from a broadcasting station. Further, once the discrimination signal is detected, the gate is closed so that the output of the level detector is interrupted. Accordingly, the signal distinction circuit can reliably distinguish a signal including the discrimination signal from a signal not including the discrimination signal.

Embodiment 2

Figure 2:
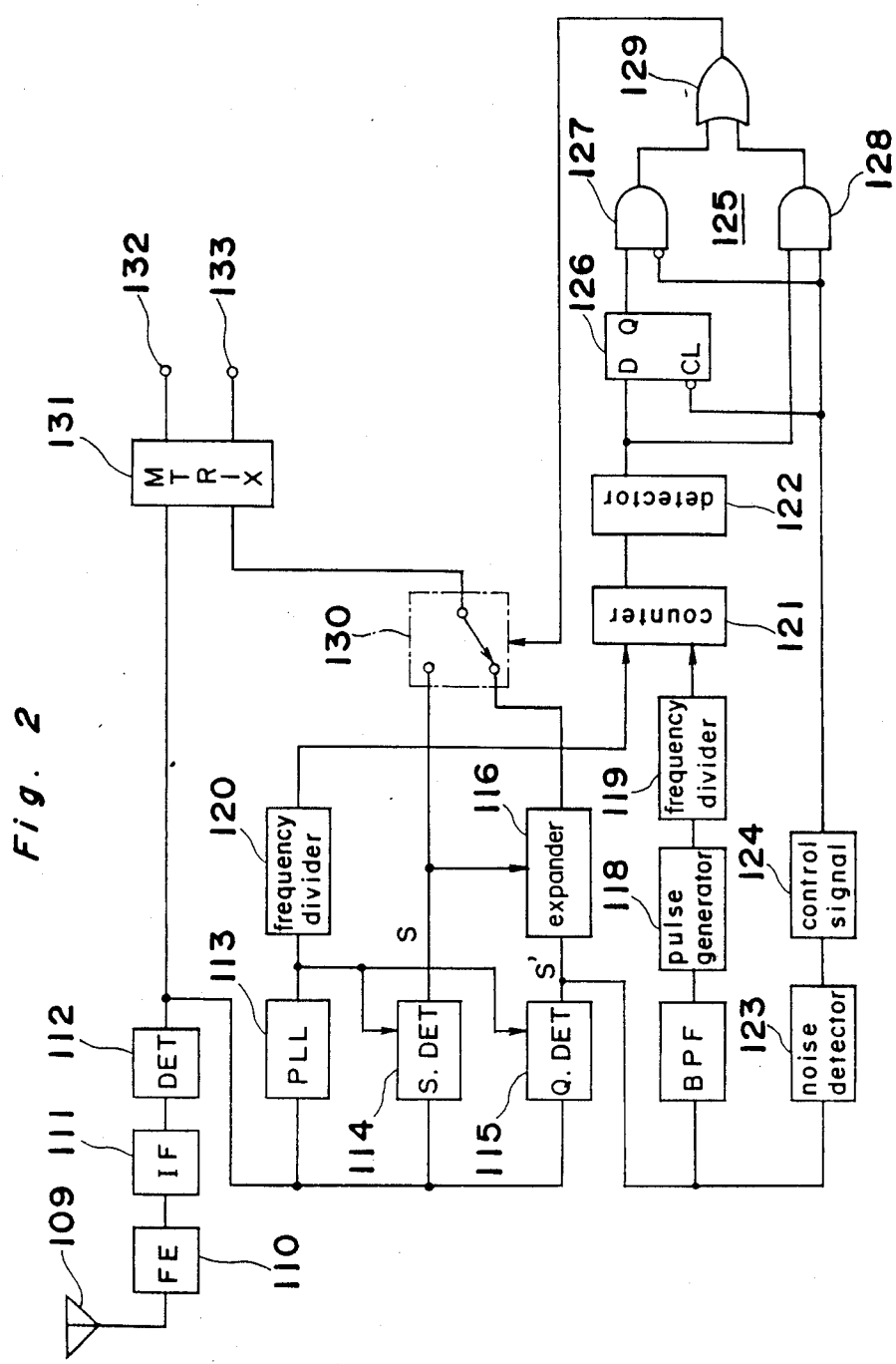
FIG. 2 is a circuit diagram showing a second embodiment of the present invention.

A signal distinction circuit according to the second embodiment of the present invention shown in FIG. 2 comprises an FM receiving antenna 109; a front end 110 for converting a received RF (radio frequency) into an IF (intermediate frequency) signal; an IF amplifier circuit 111 for amplifying the IF signal; an FM detector 112 for FM-detecting a signal outputted from the IF amplifier circuit 111; a PLL (phase locked loop) circuit 113 for generating a switching signal of 38 KHz synchronized with a stereophonic pilot signal of 19 KHz included in a signal outputted from the FM detector 112; a synchronous detector 114 for demodulating a stereophonic difference signal (S) using the switching signal of 38 KHz; a quardrature synchronous detector 115 for demodulating a compressed stereophonic difference signal (S') using the switching signal of 38 KHz; an expander 116 for expanding the compressed stereophonic difference signal (S'); bandpass filter 117 for passing therethrough a discrimination signal of 10 Hz included in the signal outputted from the quardrature synchronous detector 115; a pulse generator 118 for generating a pulse signal, the frequency of which is equal to that of the discrimination signal which has passed through the bandpass filter 117; a first frequency divider 119 for frequency-dividing a pulse outputted from the pulse generator 118; a second frequency divider 120 for frequency-dividing the switching signal of 38 Hz outputted from the PLL circuit 113, thus generating a clock signal of approximately 74 Hz; a counter 121 for counting the pulse number of the clock signal outputted from the second frequency divider 119 while the level of a signal outputted from the first frequency divider 119 maintains an "H" level; a detector 122 for detecting whether or not a value counted by the counter 121 is a predetermined value, thus outputting signals; a noise detector 123 for detecting a high frequency-noise included in the signal outputted from the FM detector 112; a control signal generator 124 for generating an "L" level control signal when the noise detector 123 detects a noise; a maintaining circuit 125 including a D-FF 126 (delayed flip flop), the (D) terminal of which is connected to the output terminal of the detector 122 and the clock terminal (CL) of which is connected to the output terminal of the control signal generator 124, a first AND gate 127 which performs an AND operation according to the level of a signal outputted from the Q output of the D-FF 126 and the level of the inverted signal of the control signal, a second AND gate 128 which performs an AND operation according to the level of a signal outputted from the detector 122 and the level of a signal outputted from the control signal generator 124, and an OR gate 129 which passes therethrough a signal outputted from the first AND gate 127 and a signal outputted from the second AND gate 128; a switch 130 which is controlled by a signal outputted from the maintaining circuit 125 and selectively outputs a signal outputted from the synchronous detector 114 and a signal outputted from the expander 116; a matrix circuit 131 for matrixing a stereophonic sum signal (M) included in the signal outputted from the FM detector 112 and a stereophonic difference signal outputted from the switch 130, thus generating a left stereophonic signal (L) at the left output terminal 132 and the right stereophonic signal (R) at the right output terminal 133.

Supposing that an FM stereophonic broadcasting is received, the counter 121 does not operate and an "L" level signal indicative of the receipt of the FM stereophonic broadcasting is outputted from the detector 122 because the discrimination signal of 10 Hz is not included in the received signal. If there is no interruption such as a multipath, no noise is included in the signal outputted from the FM detector 112 and an "H" level signal is outputted from the control signal generator 124. As a result, the first AND gate 127 is closed and the second AND gate 128 is opened, with the result that the "L" level signal outputted from the detector 122 passes through the second AND gate 128 and the OR gate 129 and is thus applied to the switch 130. Since the level of the signal applied to the switch 30 is an "L" level, the switch 130 is connected to the upper contact shown in FIG. 2, thus applying the stereophonic difference signal (S) to the matrix circuit 131. Accordingly, the stereophonic sum signal (M) and the stereophonic difference signal are matrixed and consequently, an FM stereophonic broadcasting is normally received.

If a multipath interference occurs, the noise included in the signal outputted from the FM detector 112 increases. Since the noise includes the component of 10 Hz as well, the component of 10 Hz passes through the bandpass filter 117 and a pulse in correspondence with the passage of the component of 10 Hz is outputted from the pulse generator 118. As a result, the counter 121 operates and an "H" level signal indicative of the receipt of the FMX stereophonic broadcasting is outputted from the detector 122. The noise is detected by the noise detector 123 and an "L" level control signal in correspondence with the detection of the noise is outputted from the control signal generator 124. The "L" level control signal is generated earlier than a point at which a signal outputted from the detector 122 changes from the "L" level to the "H" level. Therefore, based on the fall of the "L" level control signal, the "L" level output signal is inputted to the D-FF 126 before the level of the signal outputted from the detector 122 changes from "L" to "H", with the result that an "L" level signal is outputted from the Q output terminal of the D-FF 126. Since the level of the control changes from the "H" level to the "L" level, the first AND gate is opened and the second AND gate 128 is closed. As a result, the "L" level signal outputted from the D-FF 126 passes through the first AND gate 127 and the OR gate 129. This condition continues until the noise is removed from the signal outputted from the FM detector 112 and the level of the signal outputted from the control signal generator 124 becomes the "H" level.

Accordingly, the switch 130 be prevented from being switched while the multipath interference continues. When there is no multipath interference, the level of the signal outputted from the control signal generator 124 becomes "H", with the result that the first AND gate 127 is closed and the second AND gate 128 is opened and consequently, the signal outputted from the detector 122 passes through the second AND gate 128 and the OR gate 129.

When an FMX stereophonic broadcasting is received, the discrimination signal of 10 Hz is included in the signal outputted from the FM detector 112. Therefore, the discrimination signal passes through the bandpass filter 117. Consequently, a pulse is outputted from the pulse generator 118 and the counter 121 performs a counting operation in correspondence with the pulse outputted from the pulse generator 118. Consequently, the detector 122 outputs an "H" level signal indicative of the receipt of the FMX stereophonic broadcasting.

If there is no multipath interference at this time, the first AND gate 127 is closed and the second AND gate 128 is opened because the level of a signal outputted from the control signal generator 124 is "H". As a result, an "H" level signal outputted from the detector 122 passes through the second AND gate 128 and the OR gate 129 and then, is applied to the switch 130. As such, the switch 130 is connected to the lower contact as shown in FIG. 2, so that the stereophonic difference signal outputted from the expander 116 is applied to the matrix circuit 131, thus being matrixed with the stereophonic sum signal (M). Thus, the FMX stereophonic broadcasting can be normally received.

When the multipath interference occurs in this condition, the noise is increased in the signal outputted from the FM detector 112 and the level of a signal outputted from the control signal generator 124 becomes "L". As a result, similarly to the condition in which the FM stereophonic broadcasting is received as described above, the first AND gate 127 is opened and the second AND gate 128 is closed, so that an "H" level signal outputted from the Q output of the D-FF 126 passes through the first AND gate 127 and the OR gate 129.

If the multipath interference occurs during the receipt of the FMX stereophonic broadcasting, the discrimination signal is affected thereby, with the result that the frequency thereof is changed. Accordingly, a value counted by the counter 121 does not attain the predetermined value, so that the level of the signal outputted from the detector 122 is switched from "H" to "L". However, the level change from "H" to "L" of a signal outputted from the control signal generator 124 occurs earlier than the level change from "H" to "L" of the signal outputted from the detector 122. Therefore, the change of the signal outputted from the detector 122 is not transmitted to the switch 130.

As described above, according to the above described construction, since the noise detector and the maintaining circuit prevent the condition of a signal outputted from the distinction circuit from being changed when an interference such as a multipath interference occurs, an output corresponding to a received signal can be reliably obtained. Therefore, an unnecessary switching can be prevented from being performed when a result detected by the signal distinction circuit is used to carry out the switching from the FM stereophonic broadcasting receiving mode to the FMX stereophonic broadcasting and vice versa.

Although the present invention has been fully described in connection with the preferred embodiments thereof with reference to the accompanying drawings, it is to be noted that various changes and modification are apparent to those skilled in the art. Such changes and modification are to be understood as included within the scope of the present invention as defined by the appended claims unless they depart therefrom.

What is claimed is:

1. A signal distinction circuit having a pulse generator for generating a pulse in correspondence with the frequency of a discrimination signal; a counter for counting the number of pulses of a clock signal according to a signal outputted from said pulse generator; a detector for detecting said discrimination signal based on a value counted by said counter; comprising:
   a level detector for detecting the level of said discrimination signal, thus generating a reset signal for resetting said detector; and
   a gate circuit for interrupting said reset signal according to the condition of a signal outputted from said detector.

2. A signal distinction circuit as claimed in claim 1, wherein said detector generates a first level output signal when a value counted by said counter reaches a predetermined value and said gate circuit interrupts a signal outputted from said level detector according to said first level signal.

3. A signal distinction circuit having a pulse generator for generating a pulse according to a discrimination signal included in a received signal; a counter for counting the number of pulses of a clock signal according to a pulse outputted from said pulse generator; a detector for detecting said discrimination signal according to a value counted by said counter, comprising:
   a noise detector for detecting a noise included in a received signal; and
   a maintaining circuit for maintaining the condition of a signal outputted from said detector according to a signal outputted from said noise detector.

4. A signal distinction circuit as claimed in claim 3, wherein said maintaining circuit includes a delayed flip flop which maintains the condition of a signal outputted from said detector; a first signal path for passing therethrough a signal outputted from said delayed flip flop when a signal indicative of the presence of a noise is outputted from said noise detector; and a second signal path for passing therethrough a signal outputted from said detector when a signal indicative of the presence of a noise is not generated.

5. A signal distinction circuit as claimed in claim 3, a signal outputted from said signal distinction circuit being used to selectively switch a stereophonic difference signal of a stereophonic receiver and a signal obtained by expanding a compressed stereophonic difference signal.

* * * * *